2,882,298
PREPARATION OF ACRYLIC ACID ESTERS

Benjamin J. Luberoff, Stamford, Conn., assignor to American Cyanamid Company, New York, N.Y., a corporation of Maine No Drawing. Application March 26, 1956
Serial No. 573,658

2 Claims. (Cl. 260—486)

This invention relates to a novel and improved method for preparing acrylic acid and esters thereof. More particularly, it relates to a liquid phase reaction whereby acetylene, carbon monoxide and either water or an alcohol all being present in equivalent amounts are reacted at elevated temperatures and pressures in the presence of a nickel halide catalyst. Still more particularly, the invention concerns itself with the latter acetylene, carbon monoxide, water or alcohol reaction mixture in which there is provided a catalyst mixture of a nickel halide and a dissimilar but supplemental soluble metal iodide containing an iodide to nickel ratio greater than two.

In recent years, investigators have studied various processes for acrylic acid preparation. None of the developed processes appears to be wholly satisfactory from a commercial viewpoint. For example, in one of the best known processes, it is proposed to react acetylene, carbon monoxide and water or an alcohol in the liquid phase and in the presence of a nickel halide catalyst at an elevated temperature and pressure to give acrylic acid or its ester. This process leaves much to be desired. For instance, in such liquid phase-high pressure and temperature reactions, the time for initiating the reaction is markedly long. Even under the most favorable conditions, about fifteen minutes or more usually is required to initiate reaction. Moreover, during that time, unreacted acetylene in the reaction vessel presents a serious explosion hazard. In addition, the liquid phase-high pressure reaction as previously employed requires comparatively long residence times. As a consequence, product yield is adversely affected, apparently due to the homopolymerization of the acrylate product.

Since acrylic acid and its esters are valuable chemicals of commerce, to the present, large expenditures of time, effort and money have been devoted to attempts to improve the shortcomings of prior procedures. Nevertheless, the desire for an improved solution to the problem still remains.

It is, therefore, a principal object of the present invention to provide a process for preparing acrylic acid and its esters in good purity, while effecting reaction within a practical time period. It is a further object to provide a novel process acceptably free from undue explosion hazards.

These, and other objects, are surprisingly and successfully accomplished in a straightforward manner. It has been found that the disadvantages of the prior practice can be largely alleviated by a novel method of increasing the activity of a nickel iodide catalyst. For this result, the ratio of the iodide ion concentration to the nickel ion concentration ($I^-/Ni^{++}$) must be greater than two. In the presence of such an activated catalyst, the reaction proceeds smoothly and rapidly. Provision of an activated catalyst in which a ratio of iodide ion to nickel ion is greater than two can be accomplished by employing a supplemental but dissimilar soluble metal iodide in conjunction with nickel iodide. For example, a mixture of equimolar quantities of nickel iodide ($NiI_2$) and either sodium iodide (NaI) or zinc iodide ($ZnI_2$) will provide the required increased ratio of iodide ion to nickel ion concentration. Alternatively, a catalyst mixture of one mol of nickel chloride and three mols of sodium iodide may be used.

Although the reason for the synergistic effect is not entirely understood, the activity of such a catalyst mixture in the aforedescribed process is materially increased over that of either nickel iodide as catalyst or the relatively inert supplemental iodide alone. In general, however, the ratio of iodide ion to nickel ion is greater than two but less than about five. It is therefore a good practice to use about equal amounts of nickel iodide and the supplemental iodide.

Typically illustrative soluble metal iodide compounds other than nickel iodide will include a variety of broad classes. However, the prime requirement is that the alkali metal be soluble in the reaction medium. These are: alkali metal iodides, such as sodium iodide, lithium iodide, potassium iodide, and cesium iodide; alkaline earth iodides, such as calcium iodide, barium iodide, and strontium iodide; and other metal iodides, such as zinc iodide.

It is an advantage of the invention that the present process may be conducted batchwise, or in a semi-continuous manner, or even continuously and, if desired, in the presence of an inert solvent, such as glycol diethers. These illustratively include: ethylene glycol dimethyl ether, diethylene glycol dimethyl ether, ethylene glycol diethyl ether, diethylene glycol diethyl ether and the like.

Where an ester of acrylic acid is desired, any of a variety of primary or secondary aliphatic monohydric or polyhydric alcohols may be used, provided it is substantially soluble in the reaction medium. Illustrative alcohols include: methyl alcohol, ethyl alcohol, n-butyl alcohol, octyl alcohol, lauryl alcohol, oleyl alcohol, glycerol and pentaerythritol.

In order to facilitate a further understanding of the invention, the following examples will serve to illustrate certain more specific details of the invention, which are not to be taken as limitations thereof. Unless otherwise stated, the parts given are by weight.

Example 1

An autoclave containing a mixture of 31.3 parts of nickel iodide (0.1 mol) and 15 parts of sodium iodide (0.1 mol) dissolved in 1000 parts of butanol is charged with a gas mixture comprising 26 parts of acetylene (1 mol) and 28 parts (1 mol) of carbon monoxide to a pressure vessel of 700 pounds per square inch (p.s.i.). The reaction mass is maintained at a temperature of about 203° C. Within five minutes, the pressure decreases to above 325 p.s.i. The autoclave is permitted to cool and the excess gases are vented. Resultant reaction mass is filtered and the filtrate is vacuum distilled to recover butyl acrylate in good purity. The catalyst is recovered from the distillation residue and reused.

Example 2

Repeating the procedure of the foregoing example, but employing nickel iodide as the catalyst in the absence of a supplemental iodide, reaction is not detected within five minutes. Only after some sixty minutes is reaction observed by the drop in pressure within the reaction vessel.

Example 3

The procedure of Example 1 is repeated in every material detail except that 30 parts of sodium iodide, 31 parts of nickel iodide and 1500 parts of butanol are added to the autoclave. Within four minutes, the re-action is substantially complete.

*Example 4*

Substituting lithium iodide or zinc iodide for sodium iodide in the process of Example 3, resultant acrylate is prepared in about the same time period. With respect to zinc iodide, reaction occurs in six minutes and in the case of lithium iodide reaction occurs within about four and one-half minutes. Other metal iodides such as calcium iodide, barium iodide, strontium iodide are each substituted for the sodium iodide with substantially the same result.

Although a total pressure of 700 p.s.i. has been employed in all of the foregoing examples, the pressure can widely vary depending upon the temperature used. In general, pressures of from 200 p.s.i. to 1000 p.s.i., and preferably from 300 p.s.i. to 600 p.s.i. are used, the temperature varying in the range of from 150° C. to 250° C.

I claim:

1. In a process for preparing an ester of acrylic acid by reacting equivalent amounts of acetylene, carbon monoxide and an alcohol at an elevated temperature of at least 150° C. but not more than 250° C. and at superatmospheric pressure in the range of from about 200 p.s.i. to about 1000 p.s.i. in the presence of a nickel iodide catalyst, the improvement for obtaining the ester while effecting the reaction in a shortened time which comprises conducting said reaction in the presence of a catalyst mixture comprising nickel iodide and at least an equimolecular amount of an alkali metal iodide.

2. A process according to claim 1 in which the alkali metal is sodium.

References Cited in the file of this patent

UNITED STATES PATENTS

| 854,948   | Germany | Nov. 11, 1952 |
| 872,205   | Germany | Mar. 30, 1953 |
| 1,093,117 | France  | Nov. 17, 1954 |

OTHER REFERENCES

Carpenter: FIAT Final Report 933 (1946), pp. 3–5.

Copenhaver et al.: "Acetylene and Carbon Monoxide Chemistry" (1949), pp. 257–9, 263–5.